(12) United States Patent
Nam et al.

(10) Patent No.: US 7,245,333 B2
(45) Date of Patent: Jul. 17, 2007

(54) LIQUID CRYSTAL PANEL, LIQUID CRYSTAL DISPLAY DEVICE USING THE SAME AND METHOD OF FABRICATING THE SAME

(75) Inventors: Myung-Woo Nam, Kyongsangbuk-Do (KR); Jeong-Rok Kim, Kyongsangbuk-Do (KR); Jun-Ho Jung, Kyoungsangbuk-Do (KR); Kyung-Kyu Kang, Jinju Kyoungsangnam-Do (KR); Se-Chang Won, Kyungki-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/326,258

(22) Filed: Dec. 23, 2002

(65) Prior Publication Data
US 2003/0133070 A1    Jul. 17, 2003

(30) Foreign Application Priority Data
Dec. 29, 2001    (KR) .................. 10-2001-0088585

(51) Int. Cl.
*G02F 1/1333*    (2006.01)

(52) U.S. Cl. ........................................ 349/58; 349/110
(58) Field of Classification Search ................ 349/158, 349/58, 60, 64, 110, 122
See application file for complete search history.

(56) References Cited

U.S. PATENT DOCUMENTS

| | | | | |
|---|---|---|---|---|
| 5,432,626 A | * | 7/1995 | Sasuga et al. ................. | 349/58 |
| 5,739,880 A | * | 4/1998 | Suzuki et al. ................ | 349/110 |
| 5,844,645 A | * | 12/1998 | Kashimoto .................. | 349/106 |
| 5,847,797 A | * | 12/1998 | Van Dijk ..................... | 349/158 |
| 5,966,191 A | * | 10/1999 | Lee ............................. | 349/58 |
| 6,147,724 A | * | 11/2000 | Yoshii et al. ................. | 349/62 |
| 6,177,971 B1 | * | 1/2001 | Jung et al. ................... | 349/60 |

* cited by examiner

*Primary Examiner*—Dung T. Nguyen
(74) *Attorney, Agent, or Firm*—Morgan, Lewis & Bockius LLP

(57) ABSTRACT

A liquid crystal panel comprising a first substrate and a second substrate, wherein the first substrate protrudes at one side relative to the second substrate and the second substrate protrudes at an opposite side relative to the first substrate.

10 Claims, 5 Drawing Sheets

LIQUID CRYSTAL PANEL, LIQUID CRYSTAL DISPLAY DEVICE USING THE SAME AND METHOD OF FABRICATING THE SAME

The present invention claims the benefit of Korean Patent Application No. P2001-88585 filed in Korea on Dec. 29, 2001, which is hereby incorporated by reference.

BACKGROUND OF THE INVENTION

1. Field of the Invention

The present invention relates to a liquid crystal panel and a liquid crystal display device and, more particularly, to a liquid crystal panel having a liquid crystal display device capable of maximizing the use of the area of a mother substrate on which liquid crystal panels are formed.

2. Description of the Related Art

In general, a liquid crystal display device is a display device where data signals according to picture information are individually supplied to liquid crystal cells arranged in a matrix form, and light transmittance of the liquid crystal cells is controlled to display a desired picture. Thus, the liquid crystal display device includes a liquid crystal panel, and a driver integrated circuit (IC) for driving the liquid crystal cells. The liquid crystal cells are arranged in a pixel unit in a matrix form.

The liquid crystal panel consists of a color filter and a thin film transistor array substrate facing the color filter. The liquid crystal panel further includes a liquid crystal layer in between the color filter substrate and the thin film transistor array substrate.

Data lines and gate lines are formed on the thin film transistor array substrate of the liquid crystal panel, to intersect at right angles, thereby defining crystal cells at every intersection. The data lines transmit a data signal supplied from the data driver integrated circuit to the liquid crystal cells, and the gate lines transmit a scan signal supplied from the gate driver integrated circuit to the liquid crystal cells. At one portion of the data lines and gate lines, a data pad and a gate pad are provided in which data signals and scan signals are applied from the data driver integrated circuit and the gate driver integrated circuit.

The gate driver integrated circuit sequentially supplies the scan signal to the gate lines so that the liquid crystal cells arranged in the matrix form can be sequentially selected one line by one, and the data signal is supplied to the selected one line of liquid crystal cells from the data driver integrated circuit.

A common electrode and a pixel electrode are formed at the inner side of the color filter substrate and the thin film transistor array substrate, and apply an electric field to the liquid crystal layer. The pixel electrode is formed at each liquid crystal cell on the thin film transistor array substrate, while the common electrode is integrally formed at the entire surface of the color filter substrate. Therefore, by controlling a voltage applied to the pixel electrode in a state where a voltage is applied to the common electrode, light transmittance of the liquid crystal cells can be individually controlled.

A thin film transistor used as a switching device is formed at each liquid crystal cell. As the scan signal is supplied to the gate electrode of the thin film transistor through the gate lines to the liquid crystal cells, a conductive channel is formed between the source electrode and the drain electrode of the thin film transistor. As the data signal supplied to the source electrode of the thin film transistor through the data lines is supplied to the pixel electrode by way of the drain electrode of the thin film transistor, an electric field is applied to the liquid crystal layer of the corresponding liquid crystal cell.

The thin film transistor array substrate and the color filter substrate form the liquid crystal panel. Also, a plurality of unit panels are formed on a large scale glass substrate. Usually, four or six unit panels are simultaneously formed and cut into unit panels, thereby seeking increasing yield efficiency. The process of fabricating the liquid crystal display device will now be described.

First, unit pixels having a thin film transistor, a pixel electrode and a storage capacitor are formed in a matrix form on the thin film transistor array substrate, and a black matrix, R, G, B color filter and a common electrode are sequentially formed on the color filter substrate. Next, an orientation film is formed both on the thin film transistor array substrate and the color filter substrate, on which rubbing is performed. Rubbing is performed such that cloth is rubbed against the surface of the orientation film at a uniform pressure and speed. Through rubbing, polymer chains at the surface of the orientation film are aligned in a certain direction to determine an initial orientation direction of the liquid crystal.

Then, a seal pattern is printed on the color filter substrate, and a spacer is dispersed on the thin film transistor array substrate, or vice versa, or can be simultaneously performed on one substrate, according to process requirements. The seal pattern forms a gap for injecting liquid crystal thereto together with the spacer and prevents leakage of the injected liquid crystal. Then, the thin film transistor array substrate and the color filter substrate are attached.

Thereafter, the attached thin film transistor array substrate and the color filter substrate are cut into unit panels. As for the liquid crystal display device, the plurality of thin film transistor array substrates are formed on one large-scale mother substrate, the plurality of color filter substrates are formed on another mother substrate, and the two mother substrates are attached forming the plurality of liquid crystal panels.

Next, the liquid crystal panels are cut into unit panels. In general, cutting of the unit panels is performed through a scribing process in which a prearranged cut line is formed on the surface of the substrate with a pen having a diamond and a breaking process performed by applying mechanical force. Then, liquid crystal is injected into the cut unit panel and the injection hole is sealed.

In general, in the liquid crystal display device fabrication process, liquid crystal is injected into a plurality of liquid crystal panels, which are then cut into unit panels. As the size of the unit panel increases, a method where the plurality of liquid crystal panels are cut into unit panels and liquid crystal is injected thereto has been adopted.

The unit liquid crystal panel will now be described in detail with reference to the accompanying drawings.

FIG. 1 is a plane view of the unit liquid crystal panel formed by a thin film transistor array substrate and a color filter substrate according to the related art. In FIG. 1, the liquid crystal panel 100 includes an image display part 113 where the liquid crystal cells are arranged in a matrix form, a gate pad part 114 connected to the gate lines of the image display part 113, and a data pad part 15 connected to the data lines. The gate pad part 114 and the data pad part 115 are formed along an edge region of the thin film transistor array substrate 101 which does not overlap with the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

Though not shown in the drawing, data lines to which image information is applied and gate lines to which a scan signal is applied intersect each other. Additionally, a thin film transistor for switching the liquid crystal cells, a pixel electrode for driving the liquid crystal cells by connecting the thin film transistor, and a passivation film formed at the entire surface to protect the electrode and the thin film transistor are provided at the intersection.

Color filters separately coated at the cell regions by the black matrix and a common transparent electrode formed at the thin film transistor array substrate 101 are provided at the color filter substrate 102 of the image display part 113. A cell gap is formed by a spacer between the thin film transistor array substrate 101 and the color filter substrate 102, and the substrates are attached by a sealing part 116 which is coated with a sealing material along an outer edge of the image display part 113. Thus, liquid crystal material is injected into the cell-gap.

FIG. 2 is a cross-sectional view of a liquid crystal panel according to the related art. In FIG. 2, the liquid crystal panel includes a first mother substrate having thin film transistor array substrates 101 formed thereon and a second mother substrate having color filter substrates 102 formed thereon. One side of the thin film transistor array substrates 101 extends beyond the color filter substrates 102. This is because the gate pad part 114 and the data pad part 115 are formed at one marginal portion where the thin film transistor array substrates 101 do not overlap with the color filter substrates 102. Thus, the color filter substrates 102 formed on the second mother substrate 160 are isolated from each other by a dummy region 170 corresponding to the protruded area of the thin film transistor array substrates 101.

After the first mother substrate 150 with the thin film transistor array substrates 101 formed thereon and the second mother substrate 160 with the color filter substrates 102 formed thereon are attached, the liquid crystal panels are individually cut using scribing and breaking processes. The dummy region 170 formed at the region isolating the color filter substrates 102 of the second mother substrate 160 is removed.

Meanwhile, the liquid crystal panel, formed by the thin film transistor array substrates 101 and the color filter substrates 102, includes an active region 180 for displaying an image, and a dummy region 190 formed at an edge portion of the active region 180 for coupling with a backlight assembly (to be described). Thus, design of the panels should consider the margin of the color filter substrates 102 and the dummy region 170, and the margin of the active region 180 and the dummy region 190. Accordingly, if not properly designed, the number of color filter substrates 102 formed on the second mother substrate 160 is limited, thereby limiting the use of the second mother substrate 160.

FIG. 3 is a cross sectional view of another liquid crystal panel according to the related art. In FIG. 3, a dummy region 190 of the liquid crystal panel for coupling with the backlight assembly is minimized to relatively increase the area of the active region 180. Generally, a liquid crystal display device has characteristics for displaying an image by controlling light transmittance, rather than emitting an image by itself. Accordingly, an additional device for irradiating light to the liquid crystal panel, such as, a backlight assembly, is required.

There are two methods for providing the light source in the backlight assembly. In a first method, a lamp is disposed at the bottom of the liquid crystal panel so that light is directly transmitted to the upper surface of the liquid crystal panel. In a second method, a lamp is disposed at a side of the liquid crystal panel so that light is transmitted to the upper surface of the liquid crystal panel by a light guide plate and a reflection plate. Currently, the edge method is commonly used.

FIG. 4 is a cross sectional view of a backlight assembly of the edge method according to the related art. In FIG. 4, the backlight assembly includes a light guide plate 202 for guiding light generated from a lamp 201, and a lamp housing 203 installed at the side of the light guide plate 202 covering the lamp 201. In order to improve luminance of the liquid crystal display device, the lamp 201 and the lamp housing 203 can be formed at both sides of the light guide plate 202, or at every side along the circumference of the light guide plate 202. A cold cathode tube is commonly used as the lamp 201. Light generated from the lamp 201 is made incident onto the side of the light guide plate 202. The inner surface of the lamp housing 203 is designed such that the light generated from the lamp 201 is reflected to the side of the light guide plate 202, thereby improving efficiency of light generated from the lamp 201.

The light guide plate 202 is made of a transparent material selected from a group of plastics, such as PMMA, so that it can have a panel form of an inclined lower surface and a level upper surface (or inclined upper surface and level lower surface). The inclined surface of the light guide plate 202 has a plurality of dots or V-shaped grooves to uniformly reflect light whereby light generated from the lamp 201 is directed upwards by the upper surface of the light guide plate 202.

A reflection plate 204 is installed at the lower surface of the light guide plate 202. The reflection plate 204 reflects the light transmitted to the lower surface of the light guide plate 202, thereby reducing light loss improving the uniformity of light transmitted to the upper surface of the light guide plate 202. Accordingly, the light guide plate 202 guides light generated from the lamp 201 to the upper surface together with the reflection plate 204.

A diffusion plate and optical sheets 205, such as prism sheets, are installed at the upper surface of the light guide plate 202, and a protection sheet 206 is installed at the upper surface of the optical sheets 205. The diffusion plate disperses light made incident from the light guide plate 202 to prevent an occurrence of spotting due to partial concentration of light. The prism sheets allow light to proceed vertically after passing through the diffusion plate. Accordingly, having passed the optical sheets 205, light proceeds vertically and is uniformly distributed to the entire surface of the protection sheet 206, so that the luminance of the liquid crystal display device can be improved.

Meanwhile, the protection sheet 206 functions to protect the optical sheets 205 from dust or scratches, prevents the optical sheets 205 from moving, and diffuses light so that light distribution can be uniform. The lamp 201, the light guide plate 202, the lamp housing 203, the reflection plate 204, the optical sheets 205 and the protection sheet 206 are supported and mounted by a main support 207.

The coupling of the unit liquid crystal panel and the backlight assembly illustrated in FIGS. 2, 3 and 4 will now be described with reference to FIGS. 5 and 6.

FIG. 5 is a cross sectional view of a liquid crystal panel coupled to a backlight assembly according to the related art. FIG. 5, shows the liquid crystal panel of FIG. 2, coupled with the backlight assembly of FIG. 4, according to the related art, in which the same reference numerals are given to the same elements of FIGS. 2 and 4. In FIG. 5, the lamp 201, the light guide plate 202, the lamp housing 203, the reflection plate 204, the optical sheets 205, and the protection sheet 206 are mounted on the main support 207. The liquid crystal panel is formed of a thin film transistor array substrate 101 and the color filter substrate 102 mounted an the upper surface of the protection sheet 206. A dummy region 190 is provided above an edge portion of an active region 180 of the liquid crystal panel, and is compressed with a top case 208 attached at the side of the main support 207.

Thus, since the design of the liquid crystal panels includes the margin of the dummy region 190 between the color filter substrates 102 formed on the second mother substrate 160 and includes the margin of the dummy region 190 compressed with the top case 208 of the backlight assembly and the active region 180 for displaying an image formed at the unit liquid crystal panel, the number of color filter substrates 102 formed on the second mother substrate 160 is limited, thereby minimizing the use of the second mother substrate.

FIG. 6 is a cross sectional view of a liquid crystal panel and a backlight assembly according to the related art. FIG. 6 shows the liquid crystal panel of FIG. 3, coupled with the backlight assembly of FIG. 4, according to the related art, in which the same reference numerals are given to the same elements of FIGS. 3 and 4. In FIG. 6, the lamp 201, the light guide plate 202, the lamp housing 203, the reflection plate 204, the optical sheets 205, and the protection sheet 206 are mounted on the main support 207, and the liquid crystal panel having the thin film transistor array substrate 101 and the color filter substrate 102 is mounted at the upper surface of the protection sheet 206. However, the liquid crystal panel in this case is fabricated such that, as shown in FIGS. 3 and 6, the area of the dummy region 190 compressed with the top case 208 of the backlight assembly is minimized increasing the number of color filter substrates 102 formed on the second mother substrate 160 while constantly maintaining the area of the active region 180. Accordingly, as shown in FIG. 6, the liquid crystal panel is not supported by the main support 207, and, the top case 208 intrudes into the image display region to couple the liquid crystal panel and the backlight assembly. Therefore, this assembly makes it impractical to fabricate the liquid crystal panel.

SUMMARY OF THE INVENTION

Accordingly, the present invention is directed to a liquid crystal panel that substantially obviates one or more of the problems to limitations and disadvantages of the related art.

An object of the present invention is to provide a liquid crystal panel that is capable of maximizing a use efficiency of a mother substrate on which liquid crystal panels are formed thereon.

Another object of the present invention is to provide a liquid crystal display device formed by coupling a liquid crystal panel and a backlight assembly which can maximize a use efficiency of a mother substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal panel in which liquid crystal panel includes a first substrate, and a second substrate, wherein the first substrate protrudes at one side relative to the second substrate and the second substrate protrudes at an opposite side relative to the first substrate.

In another aspect, a liquid crystal display device includes a first substrate, a second substrate, and a backlight assembly having a main support and a top case, wherein the first substrate protrudes at one side relative to the second substrate and the second substrate protrudes at the opposite side relative to the first substrate.

In another aspect, a method of fabricating a liquid crystal display device, includes the steps of forming a liquid crystal panel having first and second substrates such that the first substrate protrudes at one side relative to the second substrate and the second substrate protrudes at the opposite side relative to the first substrate, and forming a backlight assembly having a main support for supporting the protruding portion of the first and second substrate and a top case attached to the main support and fixedly pressing an upper marginal portion.

It is to be understood that the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
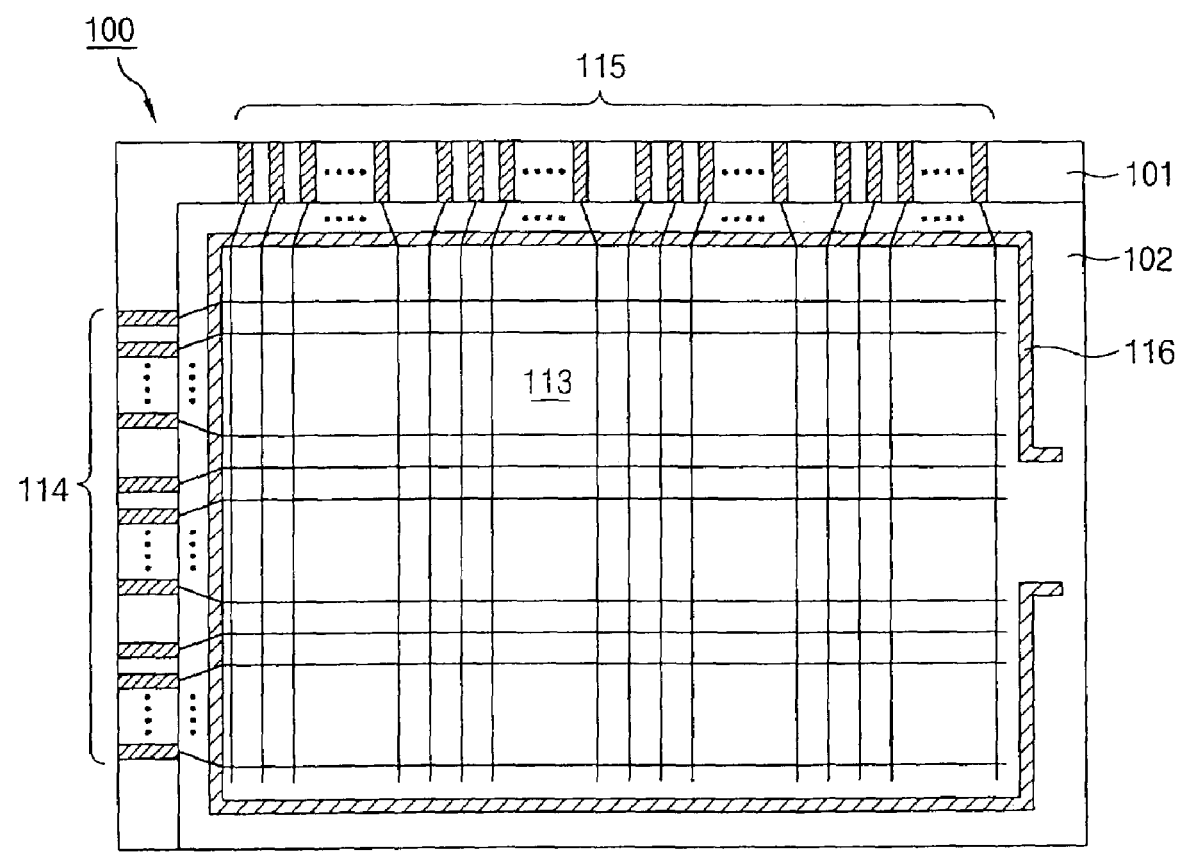
FIG. 1 is of a plane view of the unit liquid crystal panel formed by a thin film transistor array substrate and a color filter substrate according to the related art.
Figure 2:
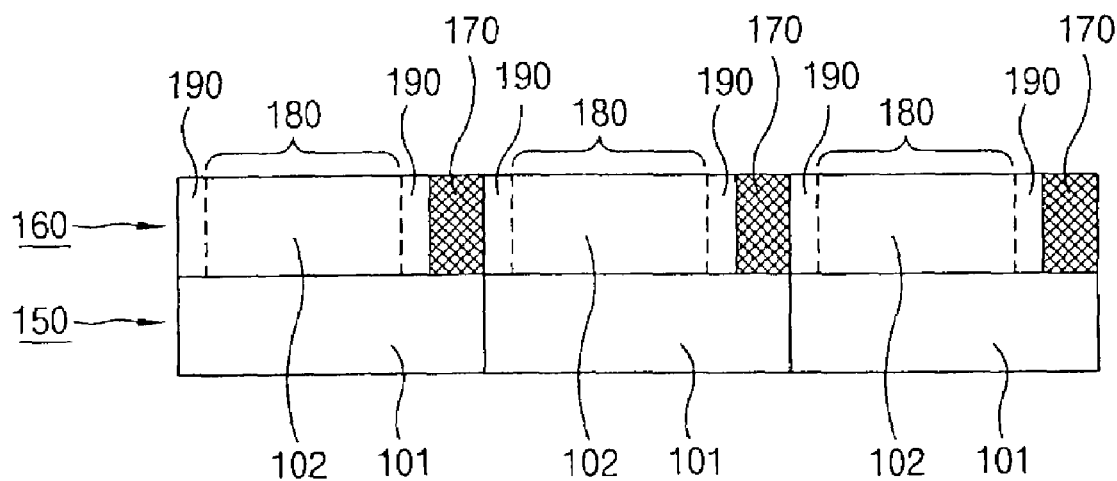
FIG. 2 is a cross sectional view of a liquid crystal panel according to the related art.
Figure 3:
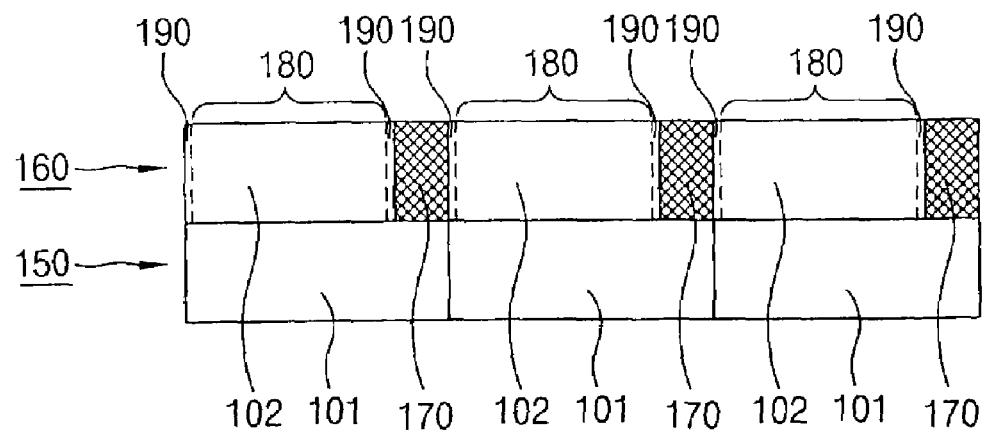
FIG. 3 is a cross sectional view of another liquid crystal panel according to the related art.
Figure 4:
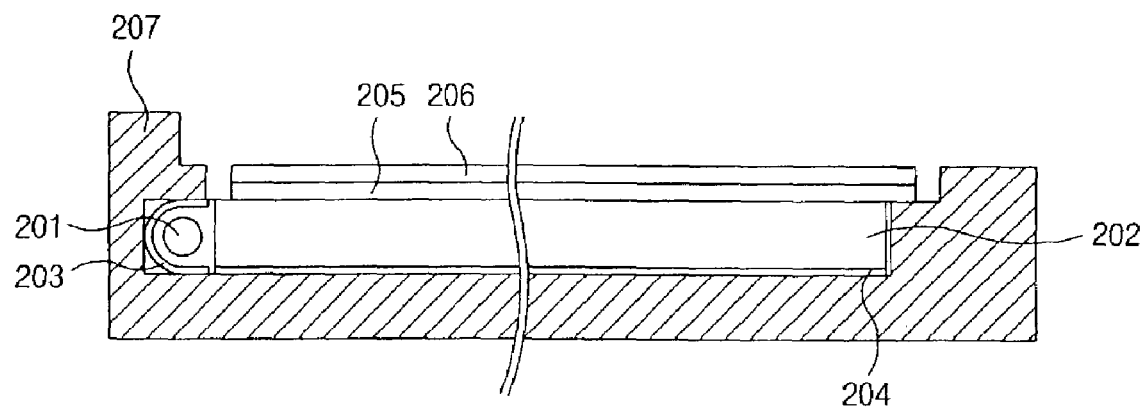
FIG. 4 is a cross sectional view of a backlight assembly of an edge type method according to related art.
Figure 5:
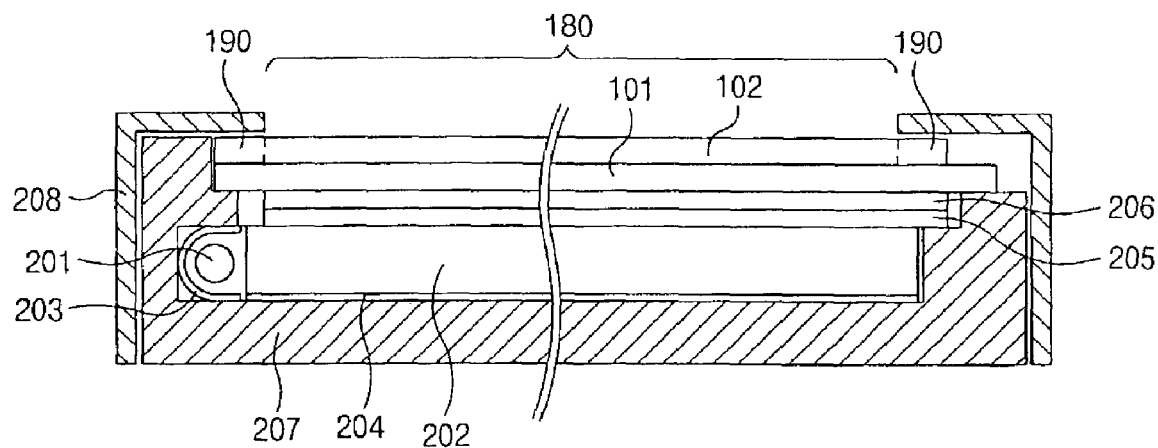
FIG. 5 is a cross sectional view of a liquid crystal panel coupled to a backlight assembly according to the related art.
Figure 6:
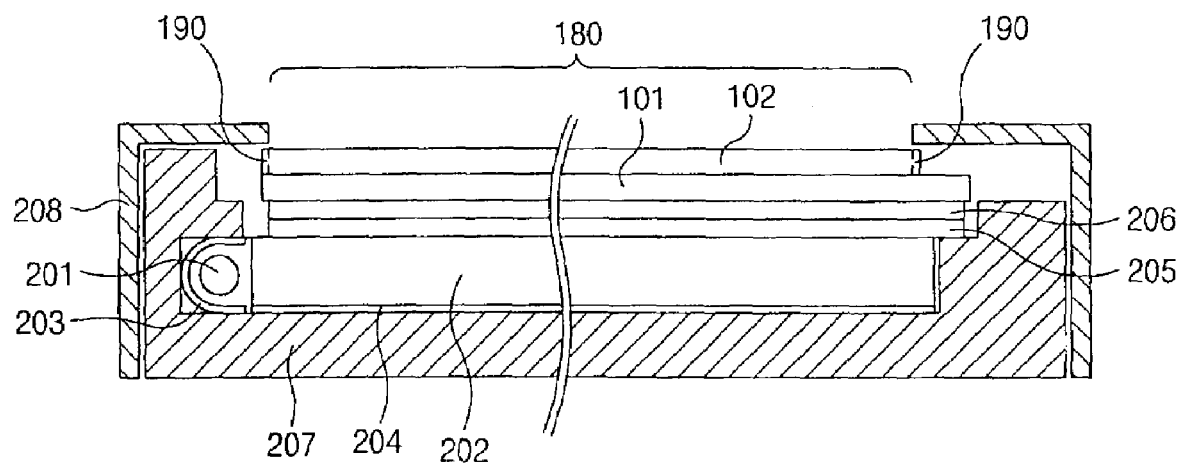
FIG. 6 is a cross sectional view of a liquid crystal panel and a backlight assembly according to the related art.
Figure 7:
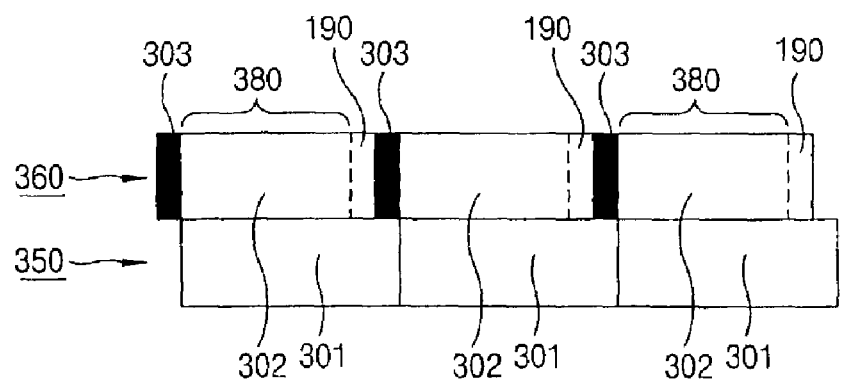
FIG. 7 is an cross sectional view of an exemplary liquid crystal panel according to the present invention.

FIG. 7 is a cross sectional view of an exemplary liquid crystal panel according to the present invention. FIG. 7 shows one side of the thin film transistor array substrates 301 protruding under the color filter substrates 302. This is because, as shown in FIG. 1, the gate pad part 114 and the data pad part 15 are formed at a marginal region where the thin film transistor array substrates 101 and the color filter substrates 102 do not overlap.

As shown in FIG. 7, the color filter substrates 302 formed on the second mother substrate 360 may be formed to be mutually adjacent, so that more color filter substrates 302 can be formed on the second mother substrate, improving the area of use of the second mother substrate 360.

In the present invention, the protruding regions of the color filter substrates 302, as shown in FIG. 7, compared to the thin film transistor array substrates 301 are supported at the lower surface by the main support of the backlight assembly and is compressed at the upper surface with the top case 408 attached to the main support 407, and thus, can be coupled with the backlight assembly. Accordingly, if the area of the active region is the same as that of the related art, more color filter substrates 302 can be formed on the second mother substrate 360, improving the area of use of the second mother substrate 360.

Figure 8:
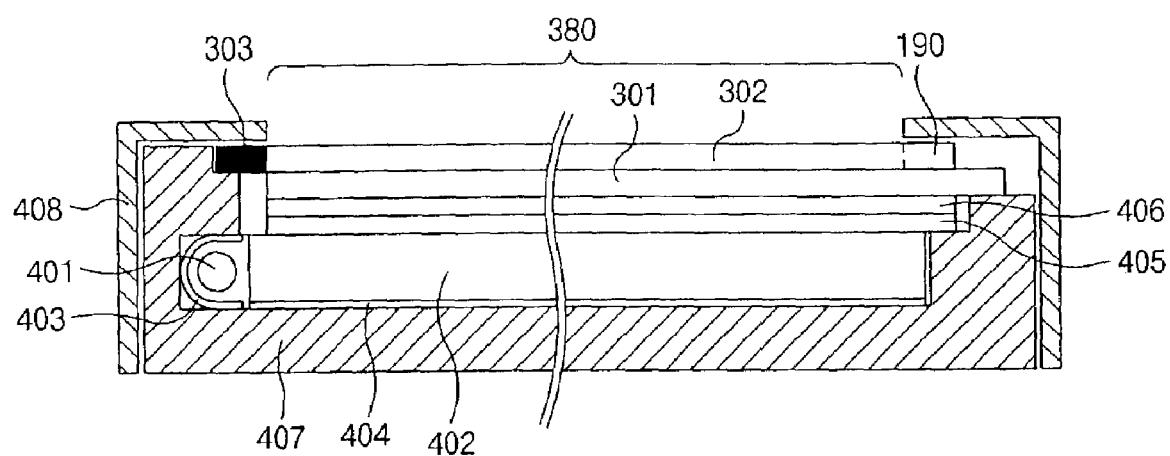
FIG. 8 is a cross sectional view of an exemplary liquid crystal display panel according to the present invention.

FIG. 8 is a cross sectional view of an exemplary liquid crystal display panel according to the present invention.

FIG. 8 is an exemplary view showing the liquid crystal panel of FIG. 7 coupled to a backlight assembly according to the present invention. In FIG. 8, a lamp 401, a light guide plate 402, a lamp housing 403, a reflection plate 404, optical sheets 405, and a protection sheet 406 may be mounted on a main support 407, and a liquid crystal panel formed of a thin film transistor array substrate 301 and a color filter substrate 302 may be mounted at an upper surface of the protection sheet 406.

In an edge backlight method where the lamp 401 is formed at one side of the light guide plate 402, the lamp 401 may be formed at both sides of the light guide plate 402, or at every side along a circumference of the light guide plate 402. In addition, the lamp 401 may be disposed at a bottom of the liquid crystal panel.

A protruding region of the color filter substrates 302 in relation to the thin film transistor array substrates 301 and the protruding region of the thin film transistor substrates 301 in relation to the color filter substrates 302 may be supported by the main support 407 of the backlight assembly. In addition, the protruding region of the color filter substrates 302 may be compressed with the top case 408 attached to the main support 407, so that the liquid crystal panel is not moved.

Meanwhile, the protruding region of the color filter substrates 302 relative to the thin film transistor array substrates 301 may be deposited with a translucent thin film or coated with a black matrix as a light leakage preventing film 303, so that the light leakage from the lamp 401 may be prevented, thereby preventing degradation of picture quality. Thus, since many more color filter substrates may be formed on the mother substrate in accordance with the present invention, maximum use of the mother substrate may be obtained. In addition, the mother board substrate may be coupled with the backlight assembly.

In the liquid crystal panel, the thin film transistor array substrate and the color filter substrate may face each other such that the thin film transistor array substrate is exposed at one side and the color filter substrate is protruding at the other side. Thus, more color filter substrates may be formed on the mother substrate. Accordingly, the area of use of the mother substrate may be improved, thereby contributing to a reduction of unit costs. In addition, since the protruded region of the color filter substrate may be coupled with the backlight assembly, movement of the liquid crystal panel may be prevented. Moreover, by forming the light leakage preventing film at the protruding region of the color filter substrate, picture quality may be improved.

It will be apparent to those skilled in the art that various modifications and variations can be made in the light panel, liquid display device, and method of fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
  a first substrate having a first portion protruding at one side of the device;
  a second substrate having a second portion protruding at a second side of the device opposite from the first portion; and
  a backlight assembly having a main support and a top case,
  wherein the second substrate includes a color filter substrate, and a light leakage preventing film is formed not overlapping the first substrate at the second protruding portion of the color filter substrate, and wherein the light leakage preventing film is sandwiched between the main support and the top case and is further arranged overlapping with a lamp of the backlight assembly.

2. The device according to claim 1, wherein the backlight assembly comprises:
  a light guide plate supported by the main support for guiding light generated from a lamp;
  a reflection plate positioned at a lower surface of the light guide plate; and
  an optical sheet and a protection sheet positioned at an upper surface of the light guide plate.

3. The device according to claim 1, wherein the first substrate includes a thin film transistor array substrate.

4. The device according to claim 3, wherein a gate pad part and a data pad part are formed on the thin film transistor substrate and one of the gate pad part and the data pad part is formed at the first a protruding portion of the thin film transistor substrate.

5. The device according to claim 4, wherein the light leakage preventing film includes a non-translucent thin film or a black matrix.

6. A liquid crystal display device comprising:
  a first substrate having a first portion protruding at a first side of the device;
  a second substrate having a second portion protruding at a second side of the device, the second portion protruding at the second side of the device having a light leakage preventing film and being opposite from the first side; and
  a backlight assembly having a top case and a main support supporting the first substrate at the first portion protruding at the first side of the device, and supporting the second substrate at the second portion protruding at the second side of the device having the light leakage preventing film, wherein the light leakage preventing film is sandwiched between the main support and the top case and is further arranged overlapping with a lamp of the backlight assembly.

7. The liquid crystal display device according to claim 6, wherein the first substrate is a thin film transistor substrate having a plurality of thin film transistors arranged in a matrix form, and the second substrate is a color filter substrate.

8. The liquid crystal display device according to claim 7, wherein a gate pad part and a data pad part are formed on the first substrate and one of the gate pad part and the data pad part is formed at the first protruding portion of the first substrate.

9. A liquid crystal display device comprising:

a first substrate having a first portion protruding at one side of the device;

a second substrate having a second portion protruding at a second side of the device opposite from the first portion; and a backlight assembly having a main support and a top case, wherein the second substrate includes a color filter substrate, and a light leakage preventing film is formed not overlapping the first substrate at the second protruding portion of the color filter substrate, and wherein the light leakage preventing film is in contact with the main support and is further arranged overlapping with a lamp of the backlight assembly.

10. A liquid crystal display device comprising:

a first substrate having a first portion protruding at one side of the device;

a second substrate having a second portion protruding at a second side of the device opposite from the first portion; and a backlight assembly having a main support and a top case, wherein the second substrate includes a color filter substrate, and a light leakage preventing film is formed not overlapping the first substrate at the second protruding portion of the color filter substrate, and wherein the light leakage preventing film is in contact with the main support and the top case, and is further arranged overlapping with a lamp of the backlight assembly.

* * * * *